US008106527B1

(12) United States Patent
Carr

(10) Patent No.: US 8,106,527 B1
(45) Date of Patent: Jan. 31, 2012

(54) HYDRAULIC POWER GENERATOR

(76) Inventor: Fred K. Carr, Chapel Hill, NC (US)

( * ) Notice: Subject to any disclaimer, the term of this patent is extended or adjusted under 35 U.S.C. 154(b) by 0 days.

(21) Appl. No.: 12/927,407

(22) Filed: Nov. 15, 2010

(51) Int. Cl.
*F03B 13/12* (2006.01)
*F03B 3/06* (2006.01)
(52) U.S. Cl. .......................................................... 290/54
(58) Field of Classification Search ............... 290/43, 290/44, 54, 55; 416/1, 205
See application file for complete search history.

(56) References Cited

U.S. PATENT DOCUMENTS

| | | | |
|---|---|---|---|
| 6,327,957 B1 * | 12/2001 | Carter, Sr. ........................ 91/41 |
| 7,736,127 B1 * | 6/2010 | Carr ................................ 416/1 |
| 7,911,074 B2 * | 3/2011 | Anderson ........................ 290/54 |
| 7,938,622 B2 * | 5/2011 | Anderson, Jr. ................... 416/6 |
| 2010/0187825 A1 * | 7/2010 | Carr ................................ 290/54 |

* cited by examiner

*Primary Examiner* — Nicholas Ponomarenko
(74) *Attorney, Agent, or Firm* — Fred K. Carr

(57) ABSTRACT

The rotor shaft of an electrical power generator, placed in a wind or water current whereby the kinetic energy causes the rotor shaft to rotate, turns a hydraulic pump generating a hydraulic pressure. The hydraulic pressure is directed to a hydraulic generator motor coupled to an electrical generator. The hydraulic pressure causes the hydraulic motor to turn which spins the generator generating electricity which is transferred to an electric grid for distribution. The generator can be distantly located from the rotors and rotor shaft, for example, on the ground adjacent to the support tower supporting the rotors and rotor shaft.

19 Claims, 3 Drawing Sheets

HYDRAULIC POWER GENERATOR

BACKGROUND OF THE INVENTION

1. Field of the Invention

The present invention relates to the generation of electrical power by wind and water electrical generating systems where a rotor shaft, being rotated by turbine blades, powers a hydraulic pump generating hydraulic pressure which is used to turn a hydraulic generator motor which spins a generator for generating electricity for distribution by an electric grid.

2. Description of the Prior Art

There has recently been a surge of interest in alternate energy sources for generating electricity by both the public and by the utility companies. The public's concern is pollution and the eventual depletion of carbon-based fuels; the utilities are concerned with the state and federal mandates requiring a higher percentage of their electricity output be produced from alternate energy sources. Solar, wind, and biomass are the main alternate energy sources now being purchased by the utilities. Residential solar has been around for years, commercial solar farms are presently being developed. There has been a lot of construction in the wind industry during recent years. The US has more wind generating systems than any other country.

Present day commercial wind turbines tend to be very large, often 40-50 stories tall. The rotor blades are long and slender. A nacelle is mounted atop a support tower. Inside the nacelle there is most often a synchronous generator coupled to the rotors through a planetary gearbox which increases the rotational speed for spinning the generator. Also in the nacelle there are numerous electronics for controlling the system, and conditioning the electrical power for the grid. Often there are dehumidifiers for conditioning the environment for the electronics.

Systems with step-up gear drive trains between the rotor and generator use high speed generators which use electromagnetic copper coils fed electricity from the generator. There has recently been interest and development work with direct-drive wind turbines. These systems do not use a geared transmission, therefore, they are called direct-drive systems. These systems use permanent magnets in the generator rotor. Since the direct-drive systems have no gear box, they have fewer parts and are lighter, and claimed to be more reliable. A very small percentage of the commercial wind generators today use direct-drive transmissions, development continues.

Water turbine development lags wind turbine development by several years. Water systems, which use water currents as the kinetic energy source rather than wind, are in the prototype development stage. There is, however, a lot of cross-over in the technologies of the two systems as they use similar step-up gear drive trains directly coupling the rotors to the generator. It is therefore anticipated that water systems development will catch-up rather quickly as more effort is devoted to water systems.

Conventional hydroelectric power generating systems use dams or barrages to divert water causing currents. Hydrokinetic systems, on the other hand, use free flowing water as the energy source. Reference is now made to U.S. Pat. No. 7,736,127, and US patent applications US2010-0187825 and US2010-0187826, all having the same inventor as the present application. These documents are incorporated as references to overview hydrokinetic technology and as disclosure documents in the present application.

Proposed or prototype developed hydrokinetic water systems to-date use either a geared transmission drive or a modification of the direct drive arrangement. That is, the rotors and generator are directly connected to each other, therefore, in close proximity to each other. They are enclosed in the nacelle of the generating system.

In the present application the turbine generates a hydraulic pressure, and the hydraulic pressure is used to spin a generator. The rotor blades and generator are not directly coupled by a mechanical drive-train, therefore, they may be distantly located as on the ground with wind systems or on the shore bank with water systems. The rotational mechanical energy from the rotors is transferred by a rotor shaft to a hydraulic pump which generates pressurized fluid. The hydraulic pressure is transferred through a pipe system to a hydraulic generator motor which spins a generator generating electricity.

The hydraulic drive approach of the present application would eliminate the need for a gearbox, therefore, generating systems would have less parts and the nacelle be lighter in weight. Problems with lubricating gear boxes have been known for years, and the problem is being experienced in commercial units today. There are also other advantages. If the generator were located on the ground, systems would be easier to install and maintain. As noted previously, commercial wind systems can be up to fifty stories tall requiring a crane for installation and sometimes for repair.

When the generator is located in the nacelle, numerous electronics are required to control the system and condition the power for use in the grid, that is, at approximately sixty cycles per second. Dehumidifiers are often needed in wind systems to condition the environment in the nacelle to protect the electronics. It is anticipated that the moisture situation in submerged water systems will be even more difficult to manage. It follows that fewer electronics in the nacelle would be desirable.

Both wind and water currents have turbulence which can cause vibrations in the rotors. These vibrations are often transferred through the gear box to the generator resulting in damage. Since the hydraulic approach decouples the rotor from the generator as there is no gearbox, this would be a solution to the vibration problem. The hydraulic drive-train could also increase the capacity factor, the time period a generator is actually producing electricity, for both wind and water systems. There is less inertia in starting the operating cycle of a hydraulic system compared to a mechanical gear drive from rest. The generating cycle would therefore start earlier, and the operating cycle last longer, thereby increasing the capacity factor.

Hydraulic pumps and motors have been widely used to drive systems in other industries for decades. The motors can be hydrostatic or hydrodynamic. The hydraulic pumps generally create a hydraulic pressure by pulling fluid from an open-system reservoir and create pressure by meshing gear teeth, rotating vanes, or by the action of gears or pistons. There are several types of pump designs as later discussed, commercially available from several companies including Volvo Hydraulics.

The pressurized fluid, usually synthetic oil, is directed to a hydraulic motor through a to-motor pipe and returned through a from-motor pipe. Hydraulic piping is widely used in hydraulic systems and commercially available. The technology for submerged piping has been recently advanced by the petroleum drilling industry which uses hydraulics for drilling and pumping. These hydraulic systems are often located miles below the ocean surface.

Hydraulic motors are combined with hydraulic pumps to form hydraulic drive systems. Hydraulic motors convert hydraulic pressure into torque or rotation, which is the rotational counterpart of a hydraulic cylinder. There are many designs for hydraulic motors, the most common designs being the gear, vane, axial plunger, and radial piston motors.

Multi pump assemblies can be used where multi pumps feed one hydraulic motor. In the present application for the water generator, one or more hydraulic pumps are coupled to a hydraulic motor which is further coupled to a generator causing it to spin generating electricity. The preferred embodiments in the present application are piston-type hydraulic pumps coupled to a bent axis hydraulic generator motors. It is noted that several types of hydraulic pump and motor combinations are possible for the presently disclosed application, thus, the preferred embodiment is not intended to be limiting.

Prior art systems generate electricity directly through either a mechanical gear drive train or a direct-drive connection, whereby there is a direct link between the rotors and the generator. The present invention generates hydraulic pressure which is used to spin the generator which may be distantly located. As discussed, there are several advantages to decoupling the rotors from the generator.

Hydraulics presently are used for other applications in the generating industry, for example, they can be used to form hydraulic transmission drives between the rotors and generator. Also, hydraulics can be used to control rotor pitch. A prior art publication relating to the use of hydraulic technology in the transmission of wind turbines is U.S. Pat. No. 7,418,820. These hydraulic transmission systems generally use a ring of cylinders arranged radial around the rotor shaft. As the shaft rotates it drives pistons into cylinders pressuring fluid which is used to power hydraulic motors, which in turn drives a generator. The 820 disclosure discloses a hydrostatic transmission which directly couples the rotors to a hydraulic pump. The transmission receives the hydraulic output and drives a generator. The transmission and generator are both located in the nacelle having a direct link to each other.

A major objective of the present invention is to decouple the rotors from the generator in a manner that the two can be located at a distance from each other. In addition, decoupling the two would help address the vibration problems in wind and water systems as well as ease installation and maintenance.

Hydraulics have been used in other industries to control rotor pitch for years, for example, in the helicopter industry. Reference is made to the aforementioned US2010-0187825 document as an example of the use of hydraulics in adjusting rotor pitch. The 0187825 document and other referenced documents cite several references in the power generating industry.

The above references fail to at least teach or suggest the design of the presently disclosed and claimed invention.

BRIEF SUMMARY OF THE INVENTION

The present invention relates to an electrical generating device and methods of use thereof for generating electricity. The generating system is placed in a wind or water current, and the rotor blades on the system are rotated by the kinetic energy in the moving wind or water currents generating rotational mechanical energy. The rotors are functionally connected to a rotor shaft causing it to rotate which in turn powers a hydraulic pump creating a hydraulic pressure. The hydraulic pressure is directed to a hydraulic motor which is coupled to an electrical generator. The hydraulic generator motor converts the pressurized flow back to rotational energy which spins the generator generating electricity for delivery to an electrical grid. In prior art systems the rotors are directly coupled to a generator through mechanical gear drive-trains which directly generate electricity. The present system uses a hydraulic drive-train eliminating the mechanical gears, which in effect, eliminates the direct mechanical coupling between the rotors and generator. This allows the rotors and generator to be distantly located from each other, the rotors are in the air or submerged in water and the generator is located on the ground.

Accordingly, the primary objective of this invention is to provide an electrical power generating system where a rotor shaft being rotated by rotor blades, which are being turned by a kinetic energy source, powers a hydraulic pump generating a hydraulic pressure which is directed to a hydraulic generator motor which is coupled to a generator causing it to spin producing electricity.

A further objective of the invention is to provide a generating system which is placed in wind current such that the wind provides the kinetic energy to turn the rotor blades and thus the rotor shaft.

A further objective of the invention is to provide a generating system which is placed in water currents such that the flowing water provides the kinetic energy to turn the rotor blades and thus the rotor shaft.

A further objective of the invention is to provide a variable pitch rotor blade where he pitch of the blade relative to the flow of water can be adjusted and maintain determining the amount of kinetic energy removed from the flowing water.

BRIEF DESCRIPTION OF THE DRAWINGS

Other features of the present invention will become evident from a consideration of the following patent drawings which form a part of this specification.

DETAILED DESCRIPTION OF THE INVENTION

Figure 1:
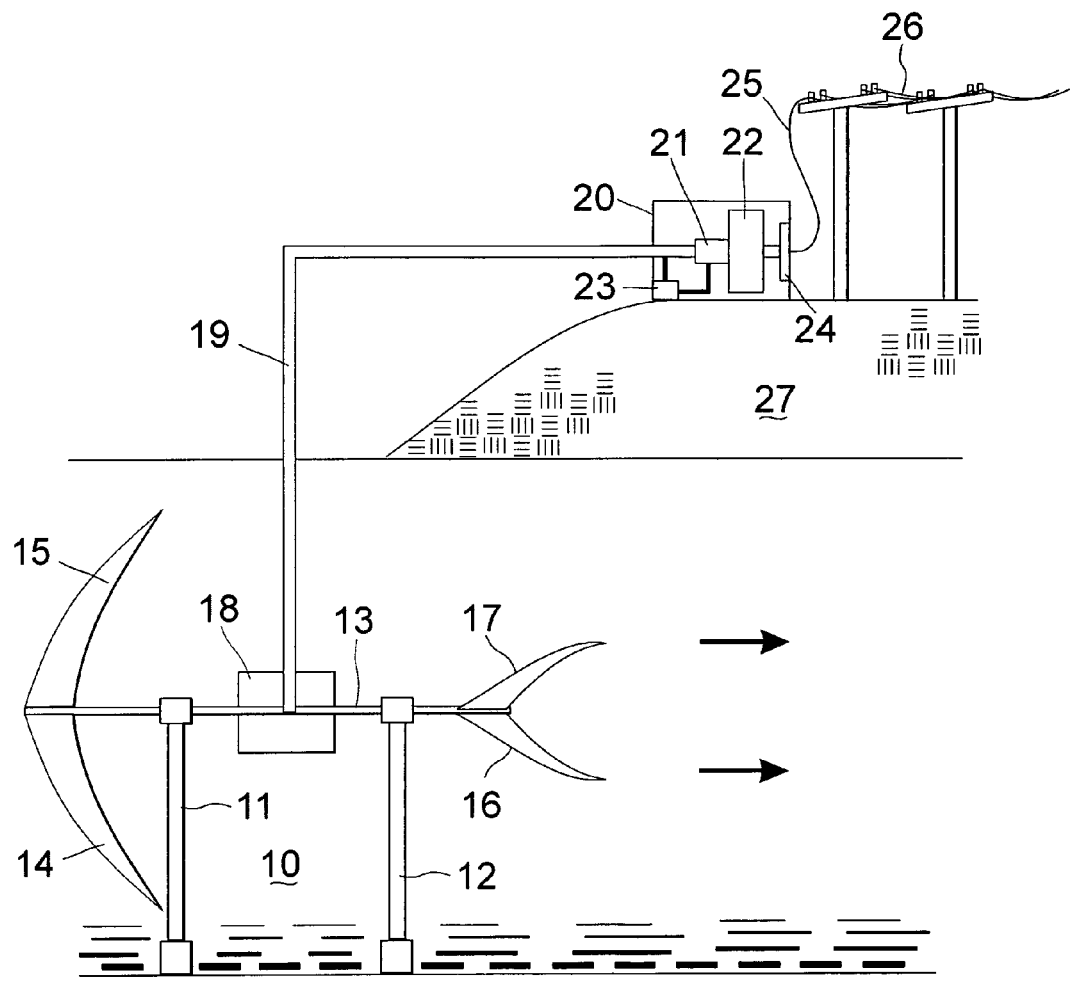
FIG. 1 is a schematic side view of the present electrical generating system submerged in flowing water showing the hydraulic system for spinning an electrical generator.

Referring now to the drawings, and first to FIG. 1, there is shown a schematic view of a hydrokinetic electrical power generating system, generally designated 10, positioned in a flowing current moving from the right to the left as indicated by the arrows. The system is positioned and maintained in the water current by support columns 11,12 which in the illustration are anchored in the seabed. However, the support frames 11,12 may be attached other ways known to those skilled in the art including existing structures as bridges and docks as well as floating structures as ships and barges. When taken together, these constitute a support means.

A rotor shaft 13 is functionally connected to the support columns 11,12 in a manner allowing the rotor shaft 13 to rotate. In the illustration four rotor blades 14,15,16,17 are attached to the rotor shaft 13 where two counter-balanced blades 14,15 are attached on a front end of rotor shaft 13 and two other counter-balanced blades 16,17 are attached on a rear end. In the illustration, the four blades are shown as being in a plane, however in practice, the two blades 14,15 at the front end and the two blades 16,17 at the rear end are set at 90 degrees to each other. Furthermore, it is noted that four blades are illustrative only, other multiples of blades are possible ranging from one blade to several blades so long as the blade combinations are counter-balanced on the rotor shaft 13 which would be required since the rotor shaft 13 is the axis of rotation. Multiple rotor blade combinations ranging from one to several blades are possible for the present application. These combinations are the antecedent basis for the term one or more rotor blades, language used in the claims. For example there could be two or three blades on the front end of the rotor shaft with no blades on the rear end of the shaft. With certain blade designs, for example a circular vane blade design, a single blade would be possible. Blade design is further discussed in U.S. Pat. No. 7,736,127 and other referenced documents.

The kinetic energy in the flowing water causes the rotor blades 14,15,16,17 to turn converting the kinetic energy into rotational mechanical energy causing the rotor shaft 13 to turn. In the present invention, the rotor shaft 13 is connected to a hydraulic pump 18 which generates a hydraulic pressure. In prior art systems, the rotor shaft is directly coupled to a mechanical gear box which directly links the rotors to a generator.

The pressurized fluid generated by the hydraulic pump 18 is directed from the pump 18 through a pipe arrangement 19 to a hydraulic generator motor 21, where the pipe arrangement 19 includes a "to motor" pipe and a "from motor" pipe for returning the fluid. Reservoir 23 is connected to the generator motor 21 for collecting the fluid after passing through the generator motor 21 where the flow pressure is converted to rotation. As with most hydraulic systems in use today, the reservoir is an open-system. The to-motor pipe and the from-motor pipe constitute a pipe means.

The hydraulic generator motor 21 causes a generator 22 to spin generating electricity; generators are widely used in industry for generating electricity overviewed below. The hydraulic motor 21, generator 22, and reservoir 23 are housed in a building 20 located on land 27 adjacent to the flowing water. The generator 22 has an electrical connection 25 to the grid whereby the electricity produced is transmitted by grid wires 26 to customers.

Hydraulic pumps are widely used in other industries as a part of hydraulic drive systems, being widely commercially available as from Volvo Hydraulic Company. The pumps can generally be hydrostatic or hydrodynamic. Hydrostatic pumps are positive displacement pumps while hydrodynamic pumps can be fixed displacement or variable displacement which allows adjustment of displacement.

There are several types of hydraulic pumps including screw pumps, gear pumps, rotary vane pumps, bent axis pumps, axial piston pumps, and radial piston pumps. The above pump types by design have varying flow rates and generated pressures to perform various hydraulic pressure work task. Of particular interest with the present system are the piston-type pumps and the bent axis motors. The radial piston type pump can be used on the rotor side to generate the hydraulic pressure and the bent axis motor can be used on the generator side to receive the pressurized fluid. Bent axis pumps and motors can be fixed or adjustable displacement, and exist in two different basic designs which use the Thoma-principle or the Wahlmark-principle. The Thoma model uses up to a 25 degree angle, and the Wahlmark model uses a spherical shaped piston with rod and rings and up to 40 degrees between the drive shaft and piston. These generally have good efficiency and are variable displacement.

Hydraulic pumps can operate as open or closed systems. Most work with open systems where the reservoir is at atmospheric pressure. Both sides of the pump are at higher pressure with enclosed systems. Normally, axial piston pumps are used where the pump includes a separate leakage connector. A multiple pump assembly is used in the present hydrokinetic application where the pressures from several pumps are directed to a hydraulic generator motor. The radial piston-type pump is of interest in this application. This type pump is often used for high pressure and relatively small flow applications. While they are generally fixed displacement pumps, the pump can be designed to switch plungers on/off producing variable displacement. The pumps discussed above constitute a hydraulic pump means.

Hydraulic motors convert the hydraulic pressure flow from the hydraulic pump back into torque or rotation, this being the rotary counter part of a hydraulic cylinder. Hydraulic motors used combined with hydraulic pumps form a hydraulic drive train system. In the present disclosure, one or more hydraulic pumps are coupled to a hydraulic motor to form a hydraulic drive train which is used to spin a generator to produce electricity.

There are many design possibilities for hydraulic motors with the most common being the gear motor, vane motor, axial plunger motor, and radial piston motor. A gear motor consists of two gears, the drive gear and the idler gear. The high pressure side oil flows around the periphery of the gear and its wall housing. The gears then mesh preventing the outflow oil from re-entering the motor. Vane motors include a housing in which a rotor with vanes is turned by the pressurized oil.

Axial plunger motors, which rotate as the plunger is forced downward, are most often used for task requiring continuous adjustable swept volumes. Axial piston pumps operate on a similar principle using a piston. Radial piston motors are available in two types. The crankshaft type uses a single cam with pistons pushing inward. Multi-lobe cam ring type motors use a cam ring with multiple lobes and the piston rollers push outwardly against the cam ring. A bent-axis piston motor is a piston actuator having pistons placed at an angle against the shaft flange. This type motor produces a very smooth output with a wide range from 1-250 liters per rev. The above hydraulic motors constitute a hydraulic generator motor means. While the preferred embodiment is the bent axis generator motor since it provides the good efficiency, other type hydraulic motors can be used in the present applications. The preferred embodiment is not intended to apply any restrictions.

One or more hydraulic pump means coupled to the above generator motor means constitute a hydraulic drive-train means which is used to spin a generator means producing electricity. While the preferred embodiment includes one or more piston-type hydraulic pumps which may be coupled to one or more bent axis generator motors to form a hydraulic drive means, other combinations are possible.

Generators are also well known in the art and are used in hydro-electric, wind and water turbines. The most commonly used is the synchronous generator which use electromagnetic copper coils. As previously discussed, recent development is directed toward direct-drive systems which use permanent magnets in the rotor. These units are commercially available as from General Electric and constitute a generator means.

Figure 2:
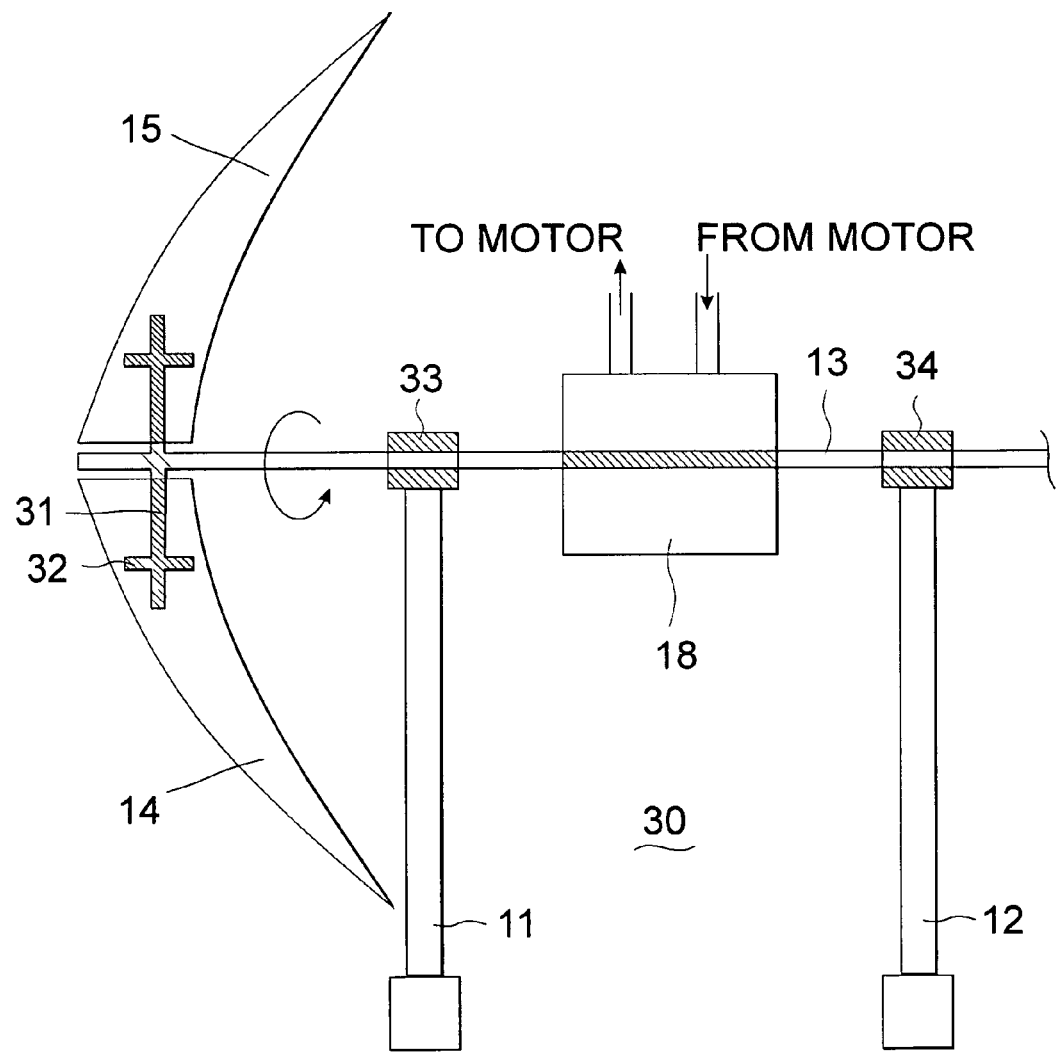
FIG. 2 is an enlarged side view of the present submersible electrical generating system.

Referring now to FIG. 2, there is shown as enlarged schematic side view of the rotor blades 14,15 attached to rotor shaft 13 which is further functionally connection to support members 11,12, generally designated 30. The upper ends of support members 11,12 have sealed bearings 33,34 through which the rotor shaft 13 passes allowing it to rotate. As the rotor shaft 13 rotates, it turns hydraulic pump 18 creating pressurized fluid which is directed to a hydraulic motor, shown in FIG. 1, by a to-motor pipe and later returned by a from-motor pipe at atmospheric pressure.

Tidal-current energy systems harness energy from flowing water that reverses direction twice per day from slack tide to high tide back to low tide, where the tides are created by solar/lunar gravitational forces. To accommodate the changing tides, the orientation of the entire system must be changed or the direction of the rotors can be reversed. The present disclosure utilizes the latter by perpendicular support axial 31 perpendicularly attached to the rotor shaft 13. Securing rings 32 are perpendicularly attached to the support axial 31 for securing the rotor blade 14 to the support axial 31.

Reference is now made to U.S. Pat. No. 7,736,127 which is incorporated as a disclosure document. Referring in particular FIG. 10 of the 127 document, there is shown a schematic view of a rotor shaft having attached a perpendicular pivotal support axial which extends into the base of a rotor. The pivotal support axial functionally connects the rotor blade to the rotor shaft in a manner which allows the rotor blade to pivot around the rotor shaft. There is also shown a securing ring perpendicularly attached to the pivotal support axial for securing the rotor blade to the support axial.

In the 127 disclosure, the generating system is shown as being enclosed in a water tight housing forming a nacelle. While the illustrative example in FIG. 1 of the present application shows the present generating system as being open, it is understood that the present disclosure can be enclosed in a nacelle. The nacelle would encompass the submerged part of the generating system with the exception of the rotors, which are attached to the rotor shaft 13. The rotor shaft 13 would enter the nacelle through a water tight seal as disclosed in the 127 disclosure. The nacelle would be supported by a support frame mounted in the seabed or to existing structures as a dock, bridges, and related.

Reference is now made to another incorporated disclosure document US2010-0187825. This document discloses and claims a microprocessor control center for controlling rotor direction and pitch through a pitch adjustment device located inside the rotor shaft. A remote control device controls the pitch adjustment device, which in the illustration is a radio frequency (RF) hydraulic control system for controlling the pitch adjustment device. A microprocessor is interfaced to a RF transmitter which emits a RF signal to a RF receiver which is part of the pitch adjustment device located in the rotor shaft. This eliminates the need for electrical cable and hydraulic hose connections. The RF receiver controls the hydraulic function of a hydraulic valve which is associated with a push/pull arrangement which through a right angle gear box causes the rotors to pivot around the above perpendicular support axial thereby controlling rotor direction and pitch. Pitch adjustment is controlled by the microprocessor in accordance with the tidal charts for obtaining a more efficient harnessing of the kinetic energy. The microprocessor control center disclosed in US application 2010-0187825 constitutes a microprocessor means.

Figure 3:
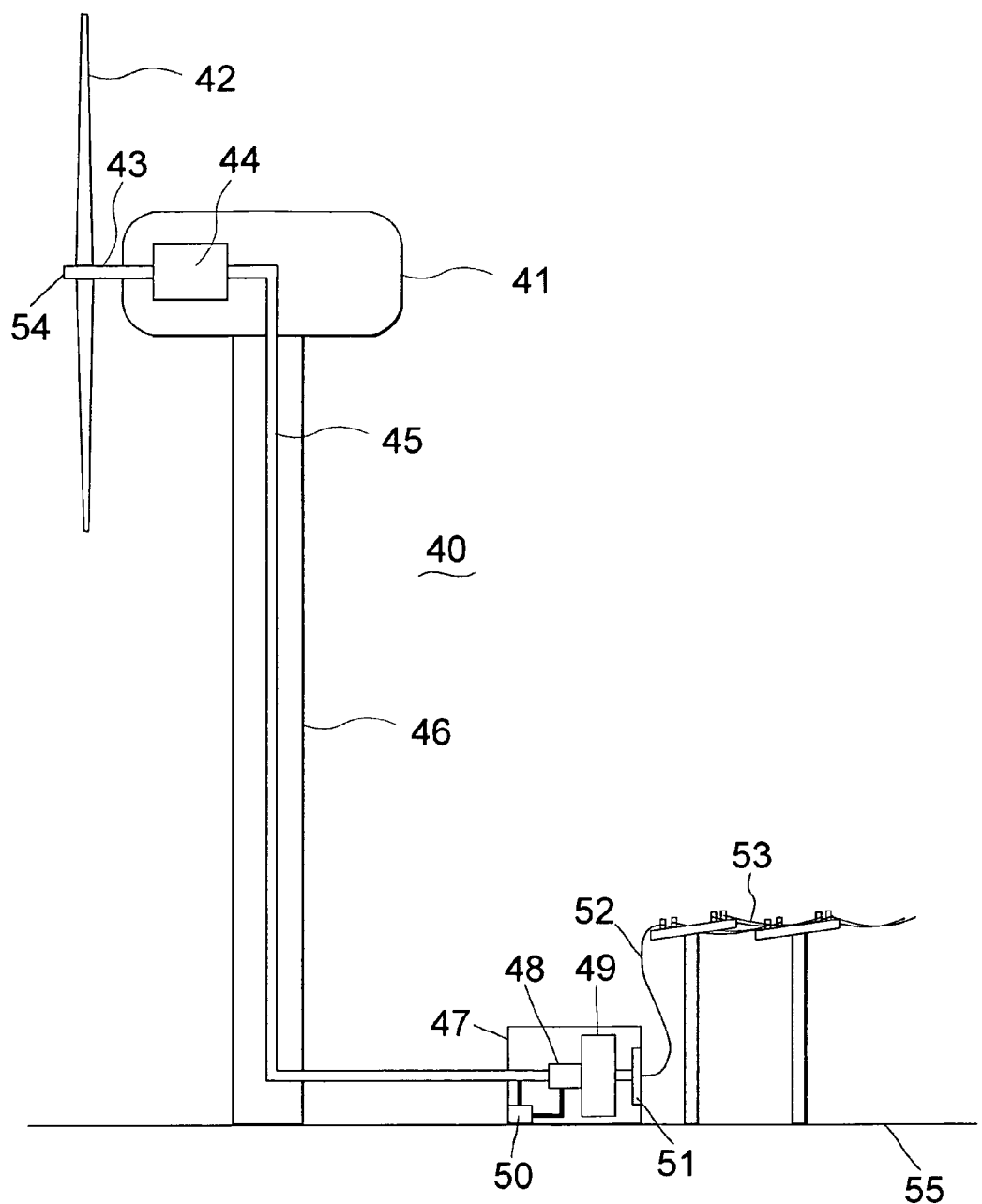
FIG. 3 is a schematic side view of the present electrical generating system positioned in a wind current showing the hydraulic system for spinning an electrical generator.

Referring now to FIG. 3, there is shown a schematic side view of a wind turbine which uses a hydraulic drive-train system to spin an electrical power generator, generally designated 40. The nacelle 41 is mounted on top of a support tower 46 which may reach 40-50 stories in the air where the wind currents are stronger. The wind currents turn the rotor 42 which is exterior to the nacelle 41 and is connected to a rotor shaft 43. One end of the rotor shaft 43 forms the rotor shaft hub 54. The other end of the rotor shaft 43 enters the nacelle 41. As previously discussed with the water system, the rotor shaft 43 turns a hydraulic pump 44 generating hydraulic pressure which is directed via a piping arrangement 45 to a hydraulic generator motor 48. The energy in the pressurized fluid is converted by the hydraulic motor 48 into rotation energy which spins a coupled generator 49. Return fluid is collected in reservoir 50 and returned to the hydraulic pump 44 to be again pressurized. The generator 49 is connected to a power conditioner 51 for conditioning the electricity, and there is a further electrical connection to the electrical grid 53. Hydraulic motor 48, reservoir 50, generator 49, and power conditioner 51 are located in a building 47 which is on the ground 55 adjacent to the wind system tower 46.

Prior art wind systems use mechanical drive-train, most often a planetary gearbox which directly couples the rotor blades to a generator. In the present disclosure, a hydraulic pump 44 in the nacelle 41 generates hydraulic pressure which powers a hydraulic motor 48 which spins a generator 49 located on the ground. As previously discussed, there are several advantages to using hydraulics to eliminate the gearbox. The nacelle 41 would be lighter without a gear box and with the generator on the ground. Also, the generator 49 would be easier to install and maintain at ground level. The hydraulic system decouples the rotor 42 from the generator 49 so that the generator is not affected by vibrations from the rotor as is the case in prior art systems.

The hydraulic pump means 44, the pipe arrangement means 45, the hydraulic generator motor means 48, the generator means 49, and the reservoir 50 are functionally the same as the units previously discussed for the water system. The primary difference is that the water turbine uses moving water as the kinetic energy source and the wind turbine uses moving wind as the kinetic energy source.

The present invention may, of course, be carried out in ways other than those herein set forth without parting from the spirit and essential characteristics of the invention. The present embodiments are therefore to be considered in all respects as illustrative and not restrictive, and all changes coming within the meaning and equivalency range of the appended claims are intended to be embraced therein.

What is claimed is:

1. An electrical power generating system having a support means for positioning and maintaining said power generating system in a water current, comprising: a rotor shaft, pivotally connected to said support means for positioning and maintaining said rotor shaft parallel to said water current, having one or more rotor blades with a base, a leading edge, a tip, and a trailing edge, where said leading edge begins at a front end of said base and continues to said tip and said trailing edge begins at said tip and continues to a back of said base functionally connected to said rotor shaft, where the kinetic energy in said water current causes said rotor blade to turn converting said kinetic energy into rotational mechanical energy, where said rotor shaft is further functionally connected to a hydraulic pump means for generating a hydraulic pressure which is transferred through a pipe means to a hydraulic generator motor means which converts said hydraulic pressure into rotational mechanical energy which spins a generator means for generating electricity which is transferred to an electric grid for distribution.

2. A power generating system as recited in claim 1, further comprising a pivotal support axial perpendicularly attached to said rotor shaft for pivotally connecting said rotor blade such that direction and pitch can be adjusted by pivoting said rotor blade around said pivotal support axial.

3. A power generating system as recited in claim 2, further comprising a microprocessor means for controlling the direction and pitch of said rotor blade by pivoting said rotor blade around said pivotal support axial.

4. A power generating system as recited in claim 2, wherein said pitch is set between thirty and sixty degrees.

5. A power generating system as recited in claim 1, further comprising a water tight nacelle for enclosing said hydraulic pump, where one end of said rotor shaft is exterior of said nacelle and functionally connected to said rotor blade, and an other end of said rotor shaft is interior of said nacelle and functionally connected to said hydraulic pump means.

6. A power generating system as recited in claim 1, wherein said hydraulic motor means and said generator means are located in a building located on the ground adjacent to said water current.

7. A power generating system as recited in claim 1, wherein said hydraulic pump means is a piston-type pump.

8. A power generating system as recited in claim 1, wherein said hydraulic generator motor means is a bent-axis motor.

9. An electrical power generating system having a nacelle mounted on top of a support tower means for positioning and maintaining said nacelle in a wind current, comprising: a rotor shaft having an exterior end exterior to said nacelle and an interior end interior of said nacelle, where said exterior end of said rotor shaft is functionally connected to a rotor blade with a base, a leading edge, a tip, and a trailing edge, where kinetic energy in said wind current causes said rotor blade to turn converting said kinetic energy into rotational mechanical energy which is transferred to a hydraulic pump means, functionally connected to said interior end of said rotor shaft, for generating a hydraulic pressure which is transferred through a pipe means, for transferring said hydraulic pressure to a hydraulic generator pump means which converts said hydraulic pressure into rotational energy which causes a generator to spin generating electricity which is transferred to an electrical grid for distribution.

10. An electrical power generating system as recited in claim 9, wherein said hydraulic generator motor means and said generator means are located in a building located on the ground adjacent to said support tower.

11. An electrical power generating system as recited in claim 9, wherein said hydraulic pump means is a piston-type pump.

12. An electrical power generating system as recited in claim 9, wherein said hydraulic generator motor means is a bent-axis motor.

13. A method for generating electricity with an electrical power generating system positioned in a kinetic energy source having a support means for positioning and maintaining said generating system in said kinetic energy source, comprising the following steps: a. harnessing the kinetic energy of said kinetic energy source by causing said generating system to be parallel to said kinetic energy source, where said generating system includes a rotor blade having a base, a leading edge, a tip, and a trailing edge; b. connecting said rotor blade to a rotor shaft through a pivoting means in a manner that said rotor blade can be pivoted to adjust rotor direction and pitch; c. setting the pitch of said rotor blade relative to said rotor shaft at an angle sufficient to cause said rotor blade to turn when said kinetic energy source strikes said leading edge flowing back to said trailing edge converting the kinetic energy of said kinetic energy source into rotational mechanical energy; d. transferring said rotational mechanical energy through said rotor shaft to a hydraulic pump means where said hydraulic pump means generates a hydraulic pressure by drawing oil from a reservoir where said hydraulic pump means creates said hydraulic pressure by displacement; e. connecting said hydraulic pump means to a hydraulic generator motor means through a pressure side pipe means for transferring said hydraulic pressure to said generator motor means where said the fluid is returned to said reservoir after passing through said generator motor means causing said generator motor means to rotate; and f. coupling said generator motor means to a generator means which causes said generator means to spin thereby generating electricity for delivery to an electrical grid.

14. The method as recited in claim 13, wherein step a is practiced by placing said generating system parallel to a water current whereby the kinetic energy in said water current is said kinetic energy source causing said rotor blade to turn.

15. The method as recited in claim 13, wherein step a is practiced by placing said generating system parallel to a wind current whereby the kinetic energy in said wind current is said kinetic energy source causing said rotor blade to turn.

16. The method as recited in claim 13, wherein step d is practiced by using a piston-type pump in said hydraulic pump means.

17. The method as recited in claim 13, wherein step e is practiced by using a bent-axis motor in said hydraulic generator motor means.

18. The method as recited in claim 13, wherein step f is practiced by using a synchronous generator in said generator means.

19. The method as recited in claim 13, wherein step e further includes the step of connecting between one and twenty said hydraulic pump means to said generator motor means.

* * * * *